US009803647B2

(12) United States Patent
Akhtar et al.

(10) Patent No.: US 9,803,647 B2
(45) Date of Patent: Oct. 31, 2017

(54) METHOD AND SYSTEM FOR REPAIRING TURBOMACHINE DOVETAIL SLOTS

(71) Applicant: General Electric Company, Schenectady, NY (US)

(72) Inventors: Kashif Akhtar, Bangalore (IN); Daryl Paul Capriotti, Greenville, SC (US); Jason Matthew Clark, Loveland, OH (US); James Bradford Holmes, Greenville, SC (US); Sandra Beverly Kolvick, Greenville, SC (US); Gang Qian, Greenville, SC (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 14/804,467

(22) Filed: Jul. 21, 2015

(65) Prior Publication Data

US 2017/0022815 A1     Jan. 26, 2017

(51) Int. Cl.
*B23Q 17/22*     (2006.01)
*B23Q 9/02*     (2006.01)
(Continued)

(52) U.S. Cl.
CPC ............ *F04D 29/322* (2013.01); *B23P 6/002* (2013.01); *B23Q 9/0007* (2013.01);
(Continued)

(58) Field of Classification Search
CPC ............... Y10T 29/37; Y10T 29/49318; Y10T 29/49726; Y10T 409/306384;
(Continued)

(56) References Cited

U.S. PATENT DOCUMENTS

| | | |
|---|---|---|
| 4,610,075 A | 9/1986 | Eriksson |
| 4,774,752 A | 10/1988 | Cooper, Jr. et al. |

(Continued)

FOREIGN PATENT DOCUMENTS

| | | |
|---|---|---|
| DE | 10 2008 000 480 A1 | 9/2009 |
| EP | 2 764 936 A2 | 8/2014 |
| EP | 3 072 622 A1 | 9/2016 |

OTHER PUBLICATIONS

Combined Search and Examination Report issued in connection with corresponding GB Application No. 1612289.7 dated Jan. 3, 2017.

(Continued)

*Primary Examiner* — Christopher Besler
*Assistant Examiner* — Matthew P. Travers
(74) *Attorney, Agent, or Firm* — Ernest G. Cusick; Frank A. Landgraff

(57) ABSTRACT

A system for repairing dovetail slots includes a slot adaptor having a body configured and disposed to nest between first and second side walls of a dovetail slot, and a tool holder configured to be coupled with the slot adaptor. The tool holder includes a tool guidance system configured and disposed to direct a tool into contact with one of the first and second side walls of the dovetail slot. A cutting tool is mounted in the tool holder. The cutting tool includes a tapered surface configured and disposed to form a tapered recess in the one of the first and second side walls of the dovetail slot.

10 Claims, 5 Drawing Sheets

(51) Int. Cl.
| | |
|---|---|
| *B24B 19/00* | (2006.01) |
| *B24B 23/08* | (2006.01) |
| *B24B 23/02* | (2006.01) |
| *B23P 6/00* | (2006.01) |
| *F04D 29/32* | (2006.01) |
| *F01D 5/02* | (2006.01) |
| *F01D 5/30* | (2006.01) |
| *B23Q 9/00* | (2006.01) |
| *F01D 5/00* | (2006.01) |
| *F04D 29/64* | (2006.01) |
| *F01D 25/28* | (2006.01) |

(52) U.S. Cl.
CPC ........ *B23Q 17/2216* (2013.01); *B24B 19/009* (2013.01); *B24B 23/02* (2013.01); *B24B 23/08* (2013.01); *F01D 5/005* (2013.01); *F01D 5/02* (2013.01); *F01D 5/3007* (2013.01); *F01D 25/285* (2013.01); *F04D 29/644* (2013.01); *B23Q 17/2233* (2013.01); *F05D 2230/10* (2013.01); *F05D 2230/80* (2013.01); *Y10T 29/37* (2015.01); *Y10T 29/49318* (2015.01); *Y10T 29/49726* (2015.01)

(58) Field of Classification Search
CPC ... Y10T 409/30644; Y10T 409/303752; Y10T 409/303808; Y10T 409/304144; Y10T 409/304424; Y10T 409/308176; Y10T 409/3084; Y10T 409/308624; B23P 6/002; B23P 6/045; F01D 5/005; F01D 25/285; F05D 2230/10; F05D 2230/72; F05D 2230/80; B24B 19/009; B24B 23/08; B23Q 9/0007; B23Q 9/0014; B23Q 9/0028; B23Q 9/0042; B23Q 9/02; B23Q 17/2216; B23Q 17/2225; B23Q 17/2233; B23Q 16/001; B23C 2215/52; B23C 2255/00–2255/12; B23C 1/20; B23C 2220/366

See application file for complete search history.

(56) References Cited

U.S. PATENT DOCUMENTS

| | | | |
|---|---|---|---|
| 4,784,540 A | 11/1988 | Underhaug | |
| 5,101,557 A | 4/1992 | Mueller et al. | |
| 6,676,336 B2 | 1/2004 | Nolan et al. | |
| 6,780,089 B2 | 8/2004 | Pan et al. | |
| 6,837,685 B2 | 1/2005 | Pierre | |
| 6,974,286 B2 | 12/2005 | Lawson | |
| 6,981,847 B2* | 1/2006 | Arinci | F01D 5/3038 416/193 A |
| 7,690,896 B2 | 4/2010 | Stevens et al. | |
| 8,182,229 B2 | 5/2012 | Rajarajan et al. | |
| 8,240,042 B2 | 8/2012 | Williams et al. | |
| 8,402,625 B2 | 3/2013 | Holmes et al. | |
| 8,602,738 B2 | 12/2013 | Rajarajan et al. | |
| 8,636,449 B2 | 1/2014 | Hynous et al. | |
| 2005/0198821 A1* | 9/2005 | Reville | B23C 1/20 29/889.1 |
| 2006/0156544 A1 | 7/2006 | Sherlock et al. | |
| 2008/0047156 A1* | 2/2008 | Lee | G01B 3/28 33/542 |
| 2010/0183444 A1* | 7/2010 | Stone | F01D 5/3053 416/220 R |
| 2012/0251327 A1 | 10/2012 | Dimmick, III | |
| 2013/0247377 A1 | 9/2013 | Hathiwala et al. | |
| 2014/0079547 A1 | 3/2014 | Zelenovic et al. | |

OTHER PUBLICATIONS

Team CCJ, "7F users collaborate on solutions to fleet-wide compressor issues", CCJONsite Combined Cycle Journal website, posted on Jun. 11, 2014, http://www.ccj-online.com/7f-users-collaborate-on-solutions-to-fleet-wide-compressor-issues/.

* cited by examiner

METHOD AND SYSTEM FOR REPAIRING TURBOMACHINE DOVETAIL SLOTS

BACKGROUND OF THE INVENTION

The subject matter disclosed herein relates to the art of turbomachines and, more particularly, to a method and system for repairing turbomachine dovetail slots.

Turbomachine systems typically include a turbomachine coupled to an intake system and a load. The turbomachine typically includes a compressor portion and a turbine portion. An airstream passes through the intake system into the compressor portion. The compressor portion forms a compressed airstream that is introduced into the turbine portion. In a gas turbomachine, a portion of the compressed airstream mixes with products of combustion in a combustor assembly forming a hot gas stream that is introduced into the turbine portion through a transition piece. The hot gas stream flows along a hot gas path interacting with various components of the turbine portion.

Both the compressor portion and the turbine portion include rotors that support a plurality of airfoils. In some cases, the airfoils are connected to the rotor through a dovetail joint. More specifically, the airfoil may include a pin and the rotor may include a tail or slot. Occasionally, cracks may develop in the rotor at the slot as a result of low cycle fatigue caused by alternating stresses generated through thermo-mechanical load. A percentage of the cracks that develop may be repaired. A repair often requires removal of the rotor from the turbomachine and mounting to a computer controlled milling machine. Typically, a computer controlled milling machine is not available on site. Thus, after removal, the rotor is shipped off-site for repair. Accordingly, cracks may lead to prolonged downtime for the turbomachine.

BRIEF DESCRIPTION OF THE INVENTION

According to one aspect of an exemplary embodiment, a system for repairing dovetail slots includes a slot adaptor having a body configured and disposed to nest between first and second side walls of a dovetail slot, and a tool holder configured to be coupled with the slot adaptor. The tool holder includes a tool guidance system configured and disposed to direct a tool into contact with one of the first and second side walls of the dovetail slot. A cutting tool is mounted in the tool holder. The cutting tool includes a tapered surface configured and disposed to form a tapered recess in the one of the first and second side walls of the dovetail slot.

According to another aspect of an exemplary embodiment, a method of repairing a dovetail slot in a turbomachine rotor wheel includes removing a blade from a rotor wheel dovetail slot having a flat slot bottom wall, a first side wall, and a second side wall, installing a slot adaptor into the dovetail slot, mounting a tool holder supporting a cutting tool to the slot adaptor, and guiding the cutting tool into one or more of the bottom wall, first side wall and second side wall forming a groove to remove cracks from the turbomachine rotor wheel.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
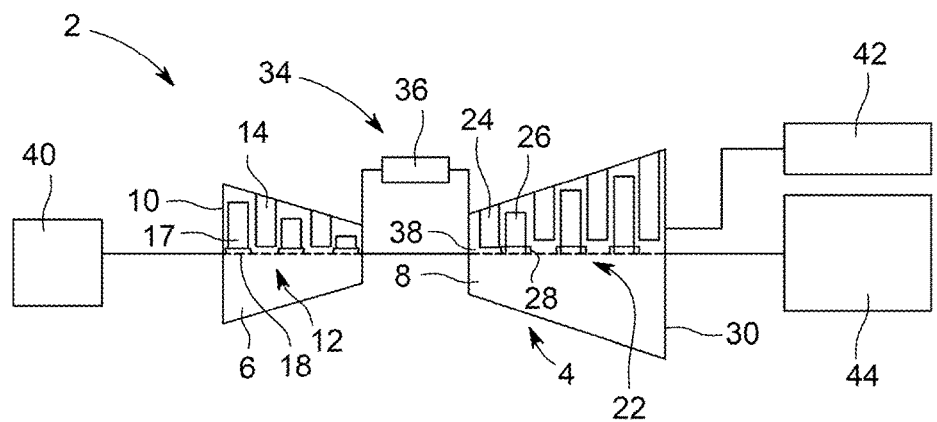
FIG. 1 depicts a turbomachine including a system for repairing dovetail slots, in accordance with an exemplary embodiment.

With initial reference to FIG. 1, a turbomachine system is indicated generally at 2. Turbomachine system 2 includes a turbomachine 4 having a compressor portion 6 connected to a turbine portion 8. Compressor portion 6 includes an inlet 10. Compressor portion 6 includes a plurality of stages 12. Each stage 12 includes a plurality of stationary compressor nozzles, one of which is indicated at 14, and a plurality of rotating compressor buckets or blades, one of which is indicated at 17. Blades 17 are coupled to a compressor rotor wheel 18. Turbine portion 8 includes a plurality of stages 22. Each stage 22 includes a corresponding plurality of stationary turbine nozzles, one of which is shown at 24, and a plurality of rotating turbine buckets or blades, such as shown at 26. Turbine blades 26 are coupled to a turbine rotor wheel 28. Turbine portion 8 also includes an outlet 30.

A combustor assembly 34 fluidically connects compressor portion 6 and turbine portion 8. Combustor assembly 34 includes one or more combustors 36. Products of combustion pass from each combustor 36 into turbine portion 8 through a corresponding transition piece (not shown). The products of combustion pass along a hot gas path 38 interacting with plurality of stages 22. Turbomachine system 2 is further shown to include an intake system 40 fluidically connected to inlet 10 and a load 42 that may be operatively connected to turbine portion 8. It should be understood that load 42 may also be connected to compressor portion 6. An exhaust system 44 is fluidically connected to outlet 30 of turbine portion 8. Exhaust system 44 receives and conditions exhaust gases passing from turbomachine 4.

Figure 2:
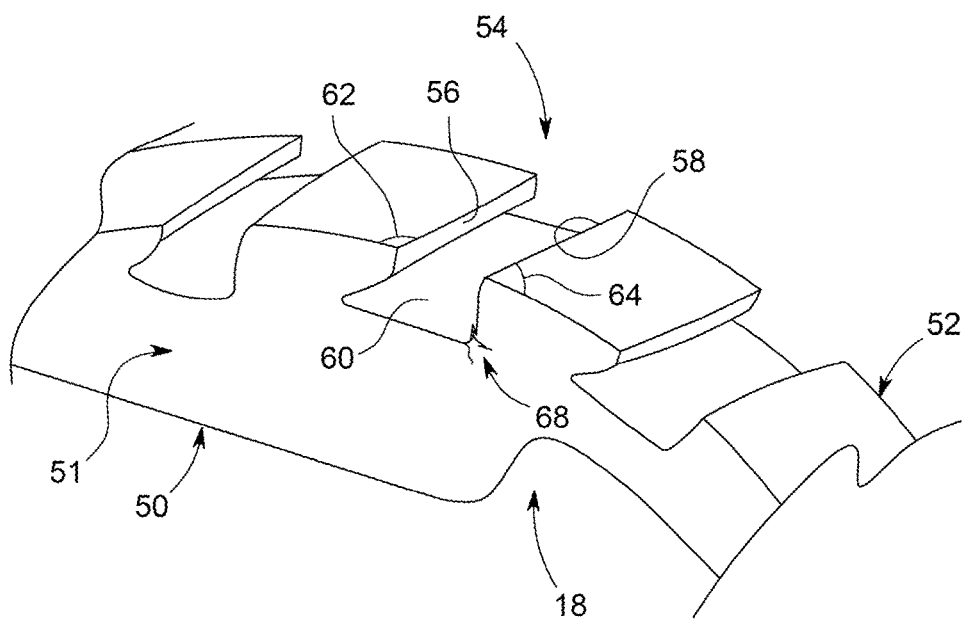
FIG. 2 depicts a prior art rotor having dovetails slots including cracks in need of repair with the system of FIG. 1.

As shown in FIG. 2, compressor rotor wheel 18 includes an outer edge 50 having a first surface 51, an opposing, second surface 52, and a plurality of dovetail slots, one of which is indicated at 54, extending therebetween. Each dovetail slot 54 includes a first side wall 56, a second side wall 58, and a bottom wall 60. In the exemplary embodiment shown, bottom wall 60 is substantially flat. As such, dovetail slots 54 may constitute flat slot bottom dovetail slots.

Dovetail slots 54 extend at a non-perpendicular angle between first and second surfaces 51 and 52. In the exemplary embodiment shown, first side wall 56 extends at an obtuse angle 62 and second side wall 58 extends at an acute angle 64 relative to first surface 51. Also in the exemplary embodiment shown, compressor rotor wheel 18 includes one or more cracks 68 that may form at first surface 51 adjacent second side wall 58 of dovetail slot 54. Cracks 68 may develop as a result of stresses induced by thermo-mechanical load and acute angle corner stress concentration. Same cracks may also develop at the opposing acute corner at second surface 52

Figure 3:
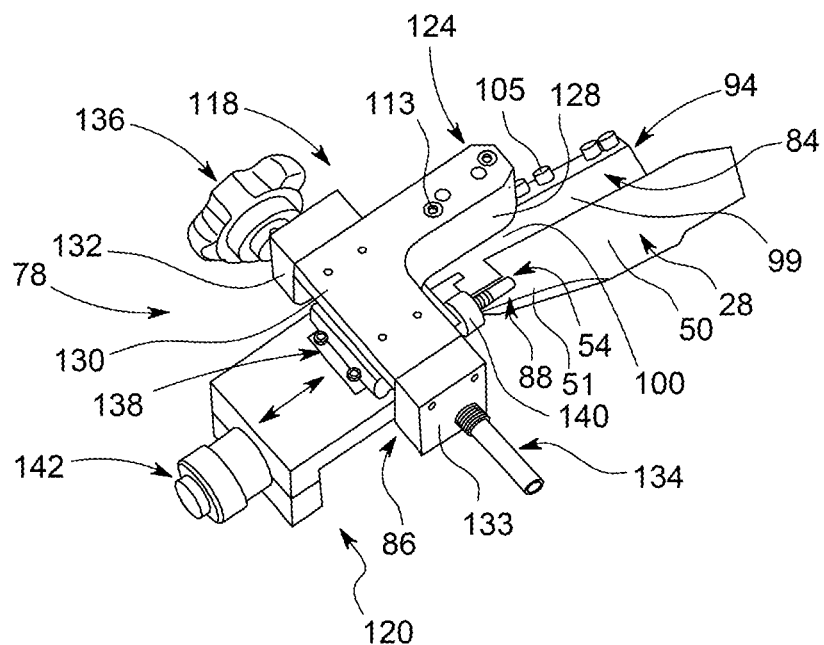
FIG. 3 depicts the system for repairing dovetail slots including a tool holder mounted to a slot adaptor arranged in a dovetail slot of the rotor of FIG. 2.
Figure 4:
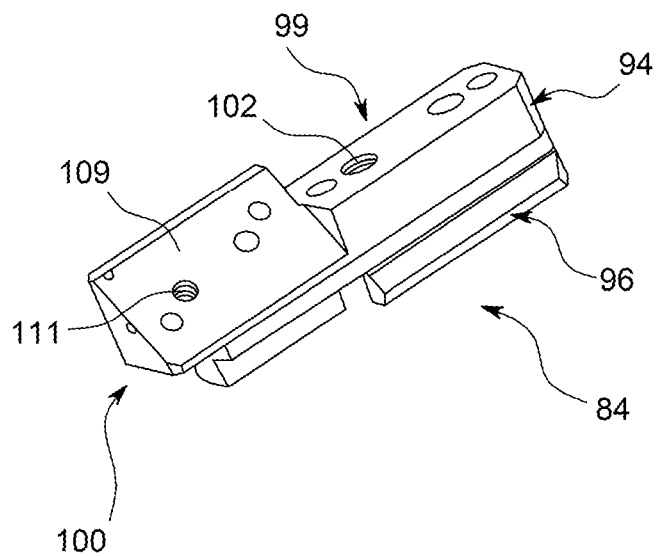
FIG. 4 depicts the slot adaptor of the system of FIG. 3.
Figure 5:
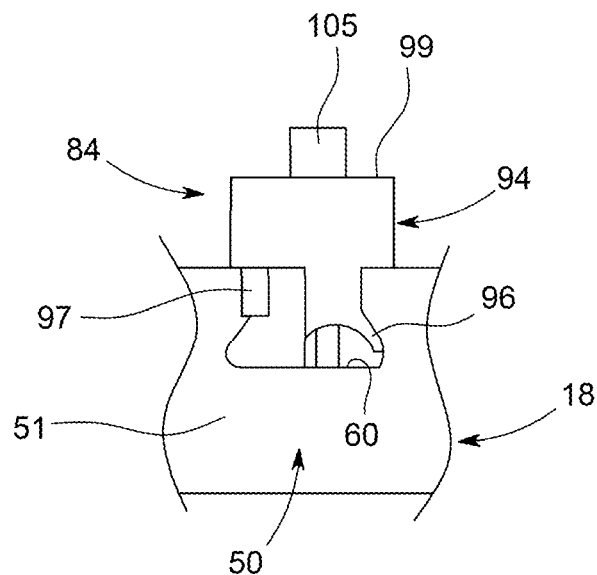
FIG. 5 depicts a cross-sectional end view of the slot adaptor of FIG. 4.

FIG. 3 depicts a system 78 for repairing dovetail slots on a rotor wheel in accordance with an exemplary embodiment. System 78 includes a slot adaptor 84, a tool holder 86, and a cutting tool 88. Slot adaptor 84, as shown in FIG. 4, includes a body 94 having one or more slot retaining features, one of which is indicated at 96 and a stop element 97 (FIG. 5). Slot retaining feature 96 is configured to be received by dovetail slot 54 with stop element 97 establishing an insertion depth relative to first surface 51. Body 94 includes a first portion 99 that includes slot retaining features, one of which is indicated at 96, and a second portion 100 that supports tool holder 86.

First portion 99 includes one or more threaded openings, such as shown at 102, that receive mechanical fasteners 105. Mechanical fasteners 105 pass through body 94 and engage bottom wall 60 urging slot retaining features 96 against first and second side walls 56 and 58. In this manner, slot adaptor 84 may be fixed within dovetail slot 54. Second portion 100 includes an angled surface 109 that supports tool holder 86 at a desired orientation relative to compressor rotor wheel 18. Angled surface 109 includes one or more threaded openings, such as shown at 111, that receive mechanical fasteners 113. Mechanical fasteners 113 secure tool holder 86 to second portion 100.

In further accordance with an exemplary embodiment, tool holder 86 includes a slot adaptor mounting portion 118 and a tool guidance system 120. Slot adaptor mounting portion 118 includes a body 124 having a first section 128 and a second section 130. First section 128 is connected to angled surface 109 through mechanical fasteners 113. Second section 130 includes a first flange 132 spaced from a second flange 133. A screw 134 extends between first and second flanges 132 and 133. Screw 134 includes a handle 136 arranged at first flange 132 and a cantilevered end (not separately labeled) that is supported at second flange 133.

Figure 9:
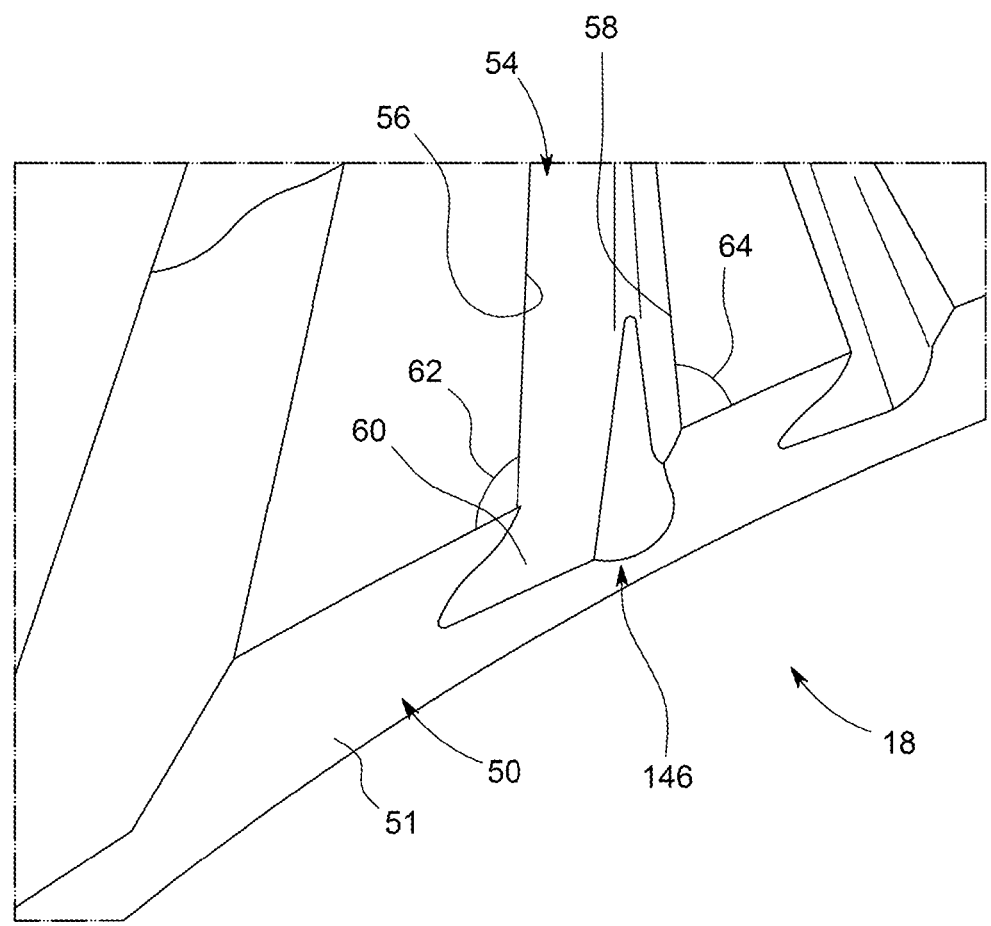
FIG. 9 depicts a repaired dovetail slot, in accordance with an exemplary embodiment.

Screw 134 cooperates with a driven member 138 provided on tool guidance system 120. In this manner, rotation of handle 136 results in linear movement of tool guidance system 120 relative to slot adaptor mounting portion 118. Tool guidance system 120 also includes a tool holder 140 for retaining cutting tool 88 and a driving member 142. Driving member 142 is coupled to tool holder 140. Rotation of driving member 142 causes a corresponding rotation of tool holder 140 and, by extension, cutting tool 88. In operation, handle 136 is rotated causing cutting tool 88 to move into second side wall 58 and bottom wall 60 of dovetail slot 54 creating a groove 146, as shown in FIG. 9. Cutting tool 88 is inserted to a desired depth that removes cracks 68.

Figure 6:
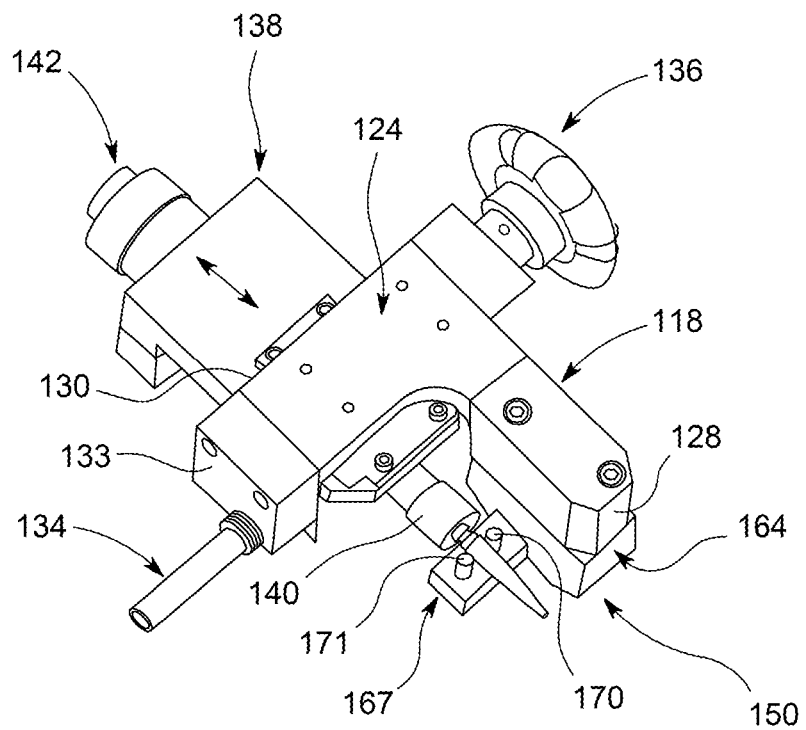
FIG. 6 depicts the system of FIG. 3 coupled to a depth gauge, in accordance with an aspect of an exemplary embodiment.

In accordance with an aspect of an exemplary embodiment, system 78 includes a depth gauge 150, shown in FIG. 6, that sets an insertion depth of cutting tool 88. Depth gauge 150 includes a mounting section 164 that attaches to first section 128 of slot adaptor mounting portion 118. Depth gauge 150 also includes a gauge section 167 having a first pin 170 spaced from a second pin 171 a desired distance. Pins 170 and 171 engage with cutting tool 88. In this manner, an insertion depth of cutting tool 88 may be set before mounting tool holder 86 to slot adaptor 84.

Figure 7:
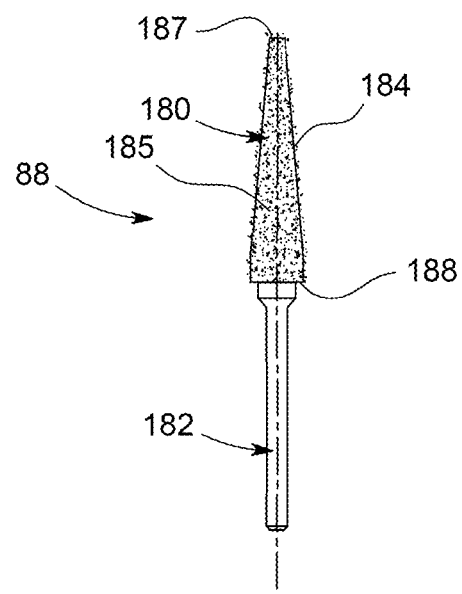
FIG. 7 depicts a cutting tool of the system of FIG. 3.

In still further accordance with an aspect of an exemplary embodiment, cutting tool 88 includes a cutting portion 180 and a shank portion 182, as illustrated in FIG. 7. In accordance with an aspect of an exemplary embodiment, cutting portion 180 includes a tapered surface 184 covered with an abrasive 185. Of course, it should be understood that abrasive 185 may form part of tapered surface 184, or may be secured to tapered surface 184. It should also be understood that tapered surface 184 may include one or more cutting surfaces. In accordance with an aspect of an exemplary embodiment, tapered surface 184 includes an angle between about 4° and about 11°. In accordance with another aspect of an exemplary embodiment, tapered surface 184 includes an angle of about 5°.

Further cutting portion 180 includes a first end 187 that extends to a second end 188 and may include a length of between about 1-inch (2.54-cm) to about 4-inches (10.16-cm). Still further, first end 187 may include a diameter about 0.100-inches (2.54-mm) and second end 188 may include a diameter of between about 0.3-inches (7.62-mm) and about 0.7-inches (17.78-mm). At this point, it should be understood that the term "about" is intended to include the degree of error associated with measurement of the particular quantity based upon the equipment available at the time of filing the application. For example, "about" can include a range of +8% or 5%, or 2% of a given value.

Figure 8:
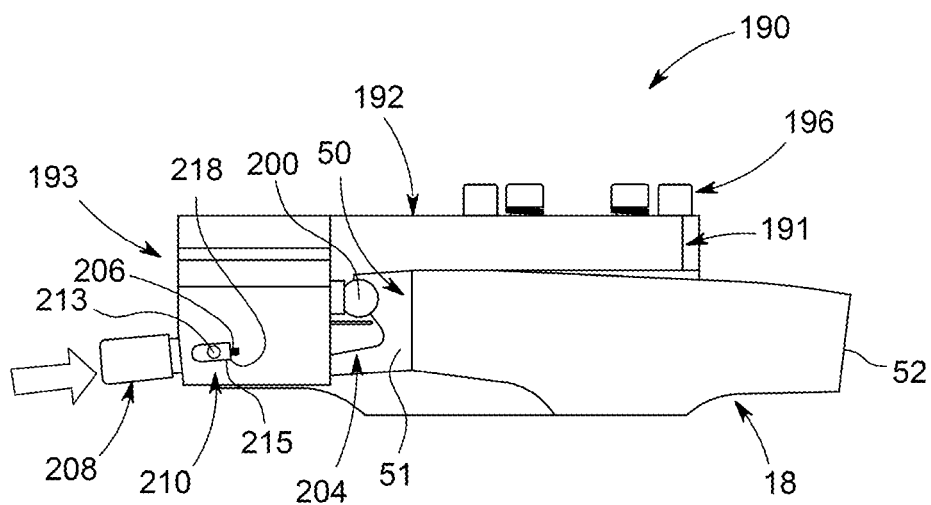
FIG. 8 depicts a test gauge mounted to the rotor of FIG. 2.

In yet further accordance with an exemplary embodiment, system 78 includes a repair cut depth gauge 190, depicted in FIG. 8. Repair cut depth gauge 190 includes a body 191 having a slot mounting portion 192 and a depth gauge portion 193. Slot mounting portion 192 includes a slot retaining feature (not shown) that may be similar to slot retaining feature 96 on slot adaptor 84. As such, slot mounting portion 192 may be mounted in slot 54 through mechanical fasteners 196 in a manner similar to that described above. Repair cut depth gauge 190 also includes a stop member 200 that establishes a relative position of depth gauge portion 193 and first surface 51 of compressor rotor wheel 18.

Once installed, a gauge or tapered pin 204 may be inserted into groove 146. Groove 146 has a radius from 0.1 to 0.4 inches viewed along slot direction and measured on outer face 51. Tapered pin 204 is mounted in depth gauge portion 193 through a spring 206 that creates an outwardly directed (away from compressor rotor wheel 18) force. Tapered pin 204 also includes an actuator 208. Actuator 208 may be manipulated to urge tapered pin 204 into groove 146. A depth indicator 210, shown in the form of a post 213, extends from tapered pin 204 through a window 215 formed in depth gauge portion 193. Window 215 includes a stop 218 that engages with post 213. In this manner, a technician may determine whether groove 146 is formed to a desired depth.

At this point, it should be understood that the exemplary embodiments describe a system for repairing cracks that may form in a turbomachine rotor wheel. The system may be installed and utilized without the need to remove the rotor wheel from the turbomachine. Further, the system may repair cracks without the need for expensive equipment, such as computer controlled mills, or the need for off-site repair facilities that contribute to downtime and repair costs. Still further, it should be understood that the system may be installed into and employed to repair a single slot. In this manner, the exemplary embodiment may reduce blade removal and machine downtime.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for repairing dovetail slots comprising:
a slot adaptor having a body configured and disposed to nest between first and second side walls of a dovetail slot;
a tool holder configured to be coupled with the slot adaptor, the tool holder including a tool guidance system configured and disposed to direct a tool into contact with one of the first and second side walls of the dovetail slot; and
a cutting tool mounted in the tool holder, the cutting tool including a tapered surface configured and disposed to form a tapered recess in the one of the first and second side walls of the dovetail slot; and
a cutting tool depth gauge detachably mounted to the slot adaptor, the depth gauge establishing an insertion depth of the cutting tool, wherein the depth gauge includes first and second pins configured and disposed to engage with the tapered sided surface of the cutting tool.

2. The system of claim 1, wherein the slot adaptor includes a slot retaining feature configured and disposed to nest within the dovetail slot.

3. The system of claim 1, wherein the slot adaptor includes at least one mechanical fastener configured and disposed to extend through the body and engage with the dovetail slot.

4. The system of claim 1, wherein the tool holder includes a slot adaptor mounting portion detachably coupled to the slot adaptor, the tool guidance system being movably mounted relative to the slot adaptor mounting portion.

5. The system of claim 4, wherein the tool guidance system is coupled to the slot adaptor mounting portion through a screw, the screw being selectively rotated to move the tool guidance system relative to the slot adaptor mounting portion.

6. The system of claim 1, further comprising: a repair cut depth gauge configured and disposed to mount in the dovetail slot, the repair cut depth gauge including a tapered pin configured to measure a depth of a repair cut formed in a rotor wheel.

7. The system of claim 6, wherein the tapered pin includes a depth indicator.

8. The system of claim 7, wherein the tapered pin is spring biased in the repair cut depth gauge.

9. The system of claim 1, wherein the tapered surface of the cutting tool includes an angle of between about 4° and about 11°.

10. The system of claim 9, wherein the tapered surface of the cutting tool includes an angle of about 5°.

* * * * *